(12) United States Patent
Mahapatra et al.

(10) Patent No.: US 12,049,200 B2
(45) Date of Patent: Jul. 30, 2024

(54) DIRECT DRIVE FOR A WINDSHIELD WIPER SYSTEM

(71) Applicant: Rosemount Aerospace Inc., Burnsville, MN (US)

(72) Inventors: Guru Prasad Mahapatra, Karnataka (IN); Robin Jacob, Bangalore (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 18/332,274

(22) Filed: Jun. 9, 2023

(65) Prior Publication Data

US 2023/0311814 A1 Oct. 5, 2023

Related U.S. Application Data

(62) Division of application No. 16/597,882, filed on Oct. 10, 2019, now Pat. No. 11,713,024.

(30) Foreign Application Priority Data

Aug. 14, 2019 (IN) .............................. 201911032886

(51) Int. Cl.
*B60S 1/16* (2006.01)
*B60S 1/08* (2006.01)

(52) U.S. Cl.
CPC ................. *B60S 1/163* (2013.01); *B60S 1/08* (2013.01); *B60Y 2200/10* (2013.01); *B60Y 2200/51* (2013.01); *B60Y 2200/52* (2013.01)

(58) Field of Classification Search
None
See application file for complete search history.

(56) References Cited

U.S. PATENT DOCUMENTS

| | | | |
|---|---|---|---|
| 2,744,282 | A | 5/1956 | Dyer et al. |
| 3,814,962 | A | 6/1974 | Baermann |

(Continued)

FOREIGN PATENT DOCUMENTS

| | | |
|---|---|---|
| CN | 103401363 A | 11/2013 |
| CN | 103427567 A | 12/2013 |

(Continued)

OTHER PUBLICATIONS

European Search Report; European Application No. 19211285.2; Application Filed: Nov. 25, 2019; Search Report Mailed: Jun. 23, 2020; 8 pages.

(Continued)

*Primary Examiner* — Natasha N Campbell
*Assistant Examiner* — Pradhuman Parihar
(74) *Attorney, Agent, or Firm* — CANTOR COLBURN LLP

(57) ABSTRACT

Provided are embodiments for a direct drive wiper system. The system includes a motor that is operably coupled to a wiper system to drive one or more wiper arms of the wiper system, and a gearbox, wherein an input to the gearbox is coupled to the motor and an output of the gearbox is coupled to the wiper assembly, wherein the gearbox is configured to convert an input from the motor to an output to drive the wiper system. The system also includes a brake and stopper mechanism that is coupled to the gearbox and the wiper system. Also provided are embodiments for a method for operating the direct drive wiper system.

9 Claims, 6 Drawing Sheets

(56) References Cited

U.S. PATENT DOCUMENTS

| | | | |
|---|---|---|---|
| 4,637,091 A * | 1/1987 | Wu | B60S 1/3459 |
| | | | 15/250.16 |
| 5,203,050 A | 4/1993 | Han | |
| 5,977,678 A | 11/1999 | Miller et al. | |
| 7,676,880 B2 | 3/2010 | Moein et al. | |
| 9,293,977 B2 | 3/2016 | Whitfield et al. | |
| 10,090,749 B2 | 10/2018 | Kidd | |
| 11,420,594 B2 | 8/2022 | Vadgaonkar et al. | |
| 2016/0156257 A1 * | 6/2016 | Atkins | H02K 49/102 |
| | | | 310/74 |
| 2017/0174183 A1 * | 6/2017 | Srivatsa | B60S 1/26 |
| 2021/0046901 A1 | 2/2021 | Mahapatra | |

FOREIGN PATENT DOCUMENTS

| | | |
|---|---|---|
| DE | 102012216486 A1 | 3/2014 |
| EP | 2011703 A2 | 1/2009 |
| EP | 3778316 | 2/2021 |

OTHER PUBLICATIONS

Gouda, et al. "Comparative Study Between Mechanical and Magnetic Planetary Gears", IEEE Transactions on Magnetics, vol. 47, No. 2, Feb. 2011, pp. 439-450 (12 pages).

Melaine Desvaux, B. Multon, Hamid Ben Ahmed, Stéphane Sire. Behaviour comparison between mechanical epicyclic gears and magnetic gears. Multibody Mechatronic Systems, 54, pp. 401-410, 2017, Mechanisms and Machine Science, <10.1007/978-3-319-67567-1_38>. <hal-01629812>.

Puchhammer, "Magnetic Gearing versus Conventional Gearing in Actuators for Aerospace Applications" Proceedings of the 42nd Aerospace Mechanisms Symposium, NASA Goddard Space Flight Center, May 14-16, 2014, 7 pages.

* cited by examiner

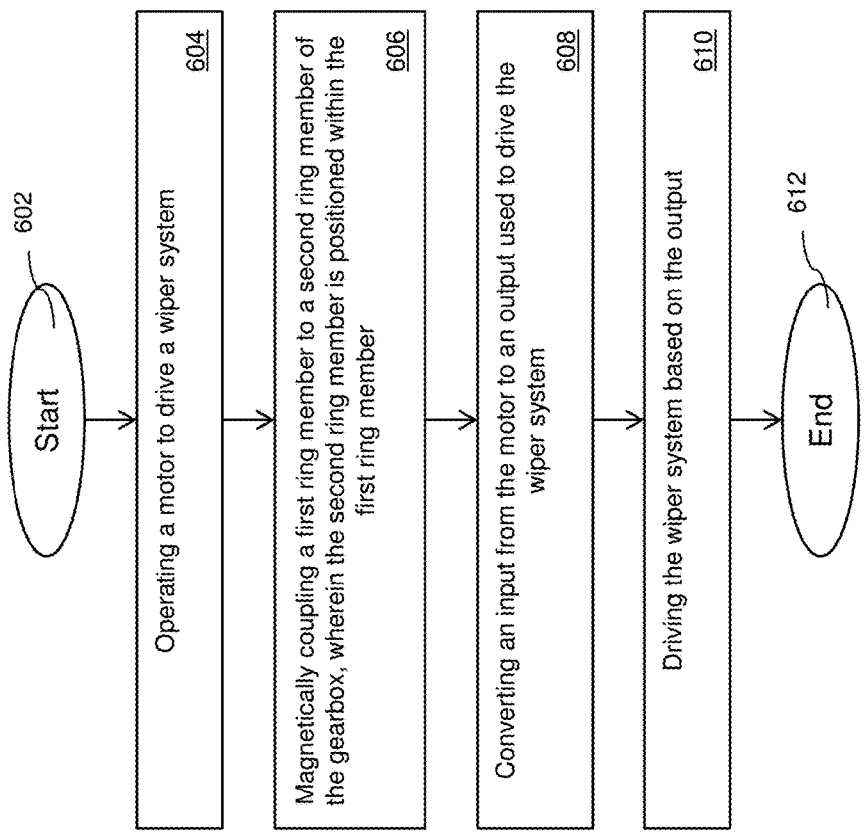

DIRECT DRIVE FOR A WINDSHIELD WIPER SYSTEM

CROSS-REFERENCE TO RELATED APPLICATION

This application is a division of U.S. application Ser. No. 16/597,882 filed Oct. 10, 2019, which claims the benefit of Indian Application No. 201911032886 filed Aug. 14, 2019, which are incorporated herein by reference in their entirety.

BACKGROUND

Exemplary embodiments pertain to the art of wiper technology and more specifically to a direct drive system for a windshield wiper system.

Windshield wiper systems are used to clean debris and remove precipitation such as ice, rain, and snow from a windshield. The windshield wiper systems can be applied to various types of vehicles including automobiles, aircraft, ships, etc. The windshield wipers systems can be designed to cover various sweep angles, speeds, number of wiper arms, and power based on the applied application.

BRIEF DESCRIPTION

According to an embodiment, a system for a direct drive for a windshield wiper system is provided. The system includes a motor operably coupled to a wiper system to drive one or more wiper arms of the wiper system; a gearbox, wherein an input to the gearbox is coupled to the motor and an output of the gearbox is coupled to the wiper assembly, wherein the gearbox is configured to convert an input from the motor to an output to drive the wiper system; and a brake and stopper mechanism coupled to the gearbox and the wiper system.

In addition to one or more of the features described herein, or as an alternative, further embodiments include a magnetic gearbox.

In addition to one or more of the features described herein, or as an alternative, further embodiments include a magnetic gearbox that includes an outer ring, an inner ring, and an interface, wherein the interface includes pole-pieces that are disposed between the outer ring and the inner ring.

In addition to one or more of the features described herein, or as an alternative, further embodiments include pole-pieces of the interface that is composed of a ferromagnetic material.

In addition to one or more of the features described herein, or as an alternative, further embodiments include pole-pieces that are coupled to a wiper shaft of the wiper system.

In addition to one or more of the features described herein, or as an alternative, further embodiments include a motor that is coupled to the inner ring to provide an input to the magnetic gearbox.

In addition to one or more of the features described herein, or as an alternative, further embodiments include a stationary outer ring.

In addition to one or more of the features described herein, or as an alternative, further embodiments include an integrated brake and stopper mechanism that is coupled to the output of the gearbox and a wiper shaft.

In addition to one or more of the features described herein, or as an alternative, further embodiments include a motor is a bi-directional motor that is configured to drive the wiper arms in a forward and reverse direction.

In addition to one or more of the features described herein, or as an alternative, further embodiments include a multi-stage magnetic gearbox.

In addition to one or more of the features described herein, or as an alternative, further embodiments include a coaxial gear arrangement for the gearbox.

According to another embodiment, a method for operating a direct drive for a windshield wiper system is provided. The method includes operating the motor to drive a wiper system; receiving an input from the motor; converting the input from the motor to an output used to drive the wiper system; and driving the wiper system based on the output.

In addition to one or more of the features described herein, or as an alternative, further embodiments include disposing an interface between a first ring member and a second ring member of the gearbox, wherein the first ring member is magnetically coupled to the second ring member.

In addition to one or more of the features described herein, or as an alternative, further embodiments include a first ring member that is coupled to an output of the motor and an interface that is coupled to a wiper shaft of the wiper system.

In addition to one or more of the features described herein, or as an alternative, further embodiments include bi-directionally operating the motor to drive the wiper system.

In addition to one or more of the features described herein, or as an alternative, further embodiments include providing overload protection by slipping the second ring member and the interface.

In addition to one or more of the features described herein, or as an alternative, further embodiments include stopping the wiper system when the wiper system is in a parked position.

In addition to one or more of the features described herein, or as an alternative, further embodiments include mechanically stopping the wipers using the integrated brake and stopping mechanism.

In addition to one or more of the features described herein, or as an alternative, further embodiments include configuring a motor speed and torque to obtain a selected wiper speed, sweep angle, and an output torque by modifying a gear ratio of the gearbox.

In addition to one or more of the features described herein, or as an alternative, further embodiments include selecting a number of poles to couple the harmonic field to achieve a selected gear ratio.

The foregoing features and elements may be combined in various combinations without exclusivity unless expressly indicated otherwise. These features and elements, as well as the operation thereof, will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 6 depicts a flowchart of a method for operating a direct drive wiper system in accordance with one or more embodiments of the invention.

DETAILED DESCRIPTION

Figure 1:
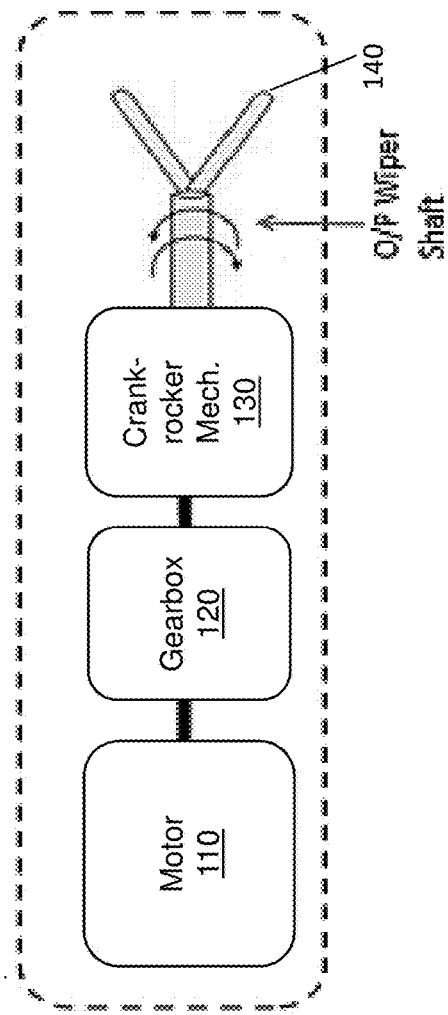
FIG. 1 depicts a prior art system using a crank rocker mechanism to drive the wiper system.

Conventional wiper systems, such as the wiper system 100 shown in FIG. 1, include a uni-directional AC/DC motor 110 and a gearbox 120 with a crank rocker mechanism 130. The gearbox 120 is a contact type gearbox 120 implementing a plurality gears for converting an input from the motor to a desired output. The gearbox 120 decreases the motor speed and increases the shaft torque used to drive the wiper arms 140. The crank rocker mechanism 130 converts the rotary motion into the oscillatory motion to control the wiper arms 140 of the wiper system 100. By reversing the direction of the wiper arms 140, significant load and stress are provided to the gears of the gearbox 120 which can eventually lead to unreliable performance and failure of the wiper system 100.

Figure 2:
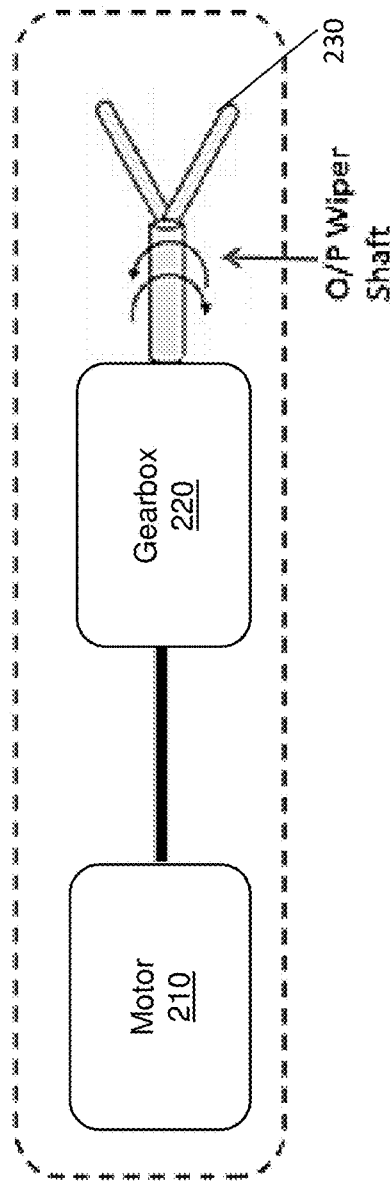
FIG. 2 depicts another prior art system using a gearbox directly coupled to the wiper system.

Other conventional gearbox systems include a planetary type gearbox that increases the torque and reduces the speed at the wiper drive shaft. As shown in FIG. 2, a direct drive system 200 includes a motor 210 and gearbox 220. The gearbox 220 is a planetary type gear configuration and is directly coupled to the wiper shaft to control the wiper arms 230. In such configurations, the gearbox 220 must be suitably designed for various aircraft applications.

The bi-directional drive of the gears can lead to increased wear of the gear teeth and bearings due to the load and stress when reversing the wiper cycles. The mechanical wear and backlash over time can be significant and lead to reduced accuracy in the wiper motion/angle, increased noise, and vibration. For higher load applications, there may be a need to add more gear stages to increase the torque output which increases the weight and wear on the components of the wiper system. There may be a need for a reliable torque transmission system, which enables the bi-directional drive to be more precise, eliminate mechanical wear, and reduce the overall weight of the system.

The techniques described herein provide a direct drive wiper system that utilizes a bi-directional motor with a magnetic gearbox with an integrated brake and stopper mechanism to drive the wiper arms and blade assembly. Because magnetic gears are contactless torque-speed conversion mechanisms, the teeth wear and need for lubrication, as required in conventional gearboxes, are eliminated.

Figure 3:
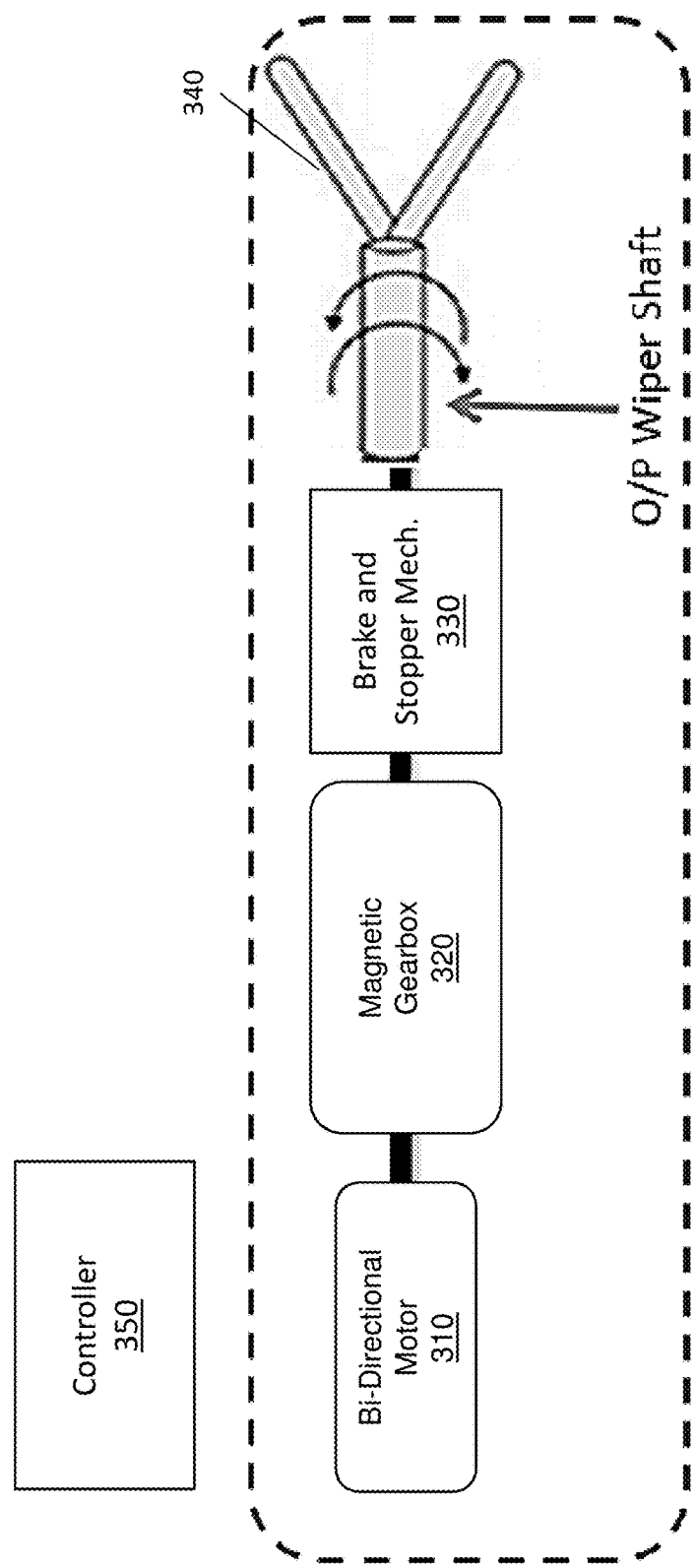
FIG. 3 depicts a direct drive system for a wiper system in accordance with one or more embodiments of the invention.

FIG. 3 depicts a direct drive wiper system 300 in accordance with one or more embodiments. The system 300 includes a motor 310 used to generate the input power to drive the windshield wipers. In one or more embodiments, the motor 310 can be a brushless DC motor and controlled by a controller 350 for bi-directional rotation to produce the desired speed, torque, and reversed after a predefined number of rotations. The bi-directional motor 310 is configured to operate the wiper arms in a forward direction and a reverse direction.

FIG. 3 also includes a magnetic gearbox 320. The magnetic gearbox 320 is operably coupled to the motor 310 to receive an input. The magnetic gearbox 320 performs a contactless conversion between the input and output to drive the wiper shaft coupled to the wiper arms 340. A coaxial gear arrangement can implemented for the magnetic gearbox 320 where the input shaft that is coupled to the gearbox 320 is on the same rotational axis as the output shaft that is coupled to the gearbox 320. Further details of the magnetic gearbox 320 are discussed with reference to FIG. 4 below.

In one or more embodiments, the output of the magnetic gearbox 320 is provided to a brake and stopper mechanism 330. Because the magnetic gearbox 320 is a contactless torque conversion system, when the wiper arms 340 are placed in the park position the wiper arms 340 are not locked in position and may be moved by wind forces. Therefore, some embodiments include a brake and stopper mechanism 330 which is used to lock the wiper arms 340 in place when not in use.

The contactless magnetic gear can also operate as an overload protection mechanism but when the wiper blade is in the park position, the external wind loads can induce an undesirable motion and hence needed a suitable braking arrangement on the magnetic gear output shaft, which prevents the wiper rotation. The braking arrangement is activated by suitable control systems when the wiper is non-operative and in the parked position.

A mechanical stopper is installed at the gear output shaft to prevent the wiper motion to extend beyond the windshield limits. In case of a failure, the mechanical stopper arrests the wiper shaft, which leads to overload condition in the magnetic gears and results in slippage in the contactless magnetic gears. The mechanism provides an integral unit for park braking and over-sweep protection/stopper for safety enhancement.

Figure 4:
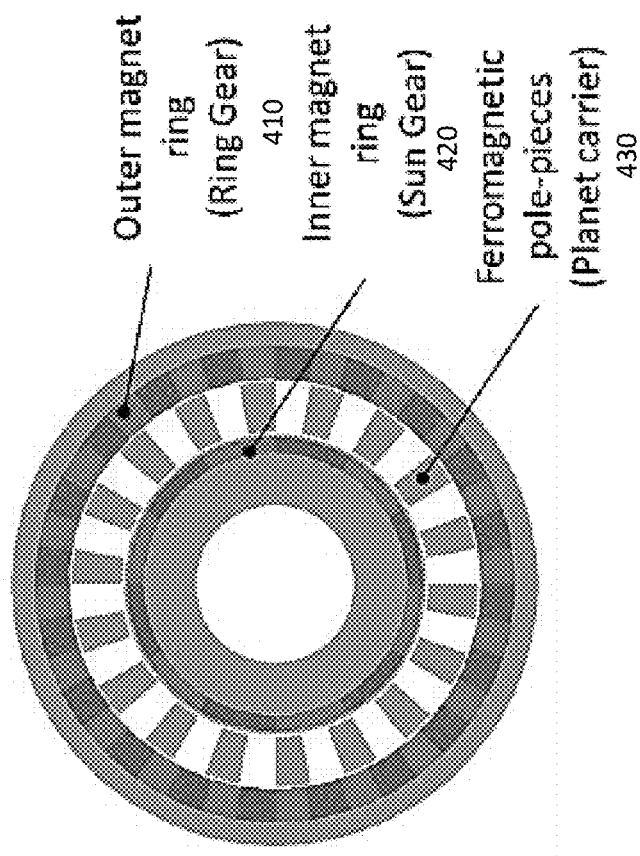
FIG. 4 depicts a magnetic gearbox used in a wiper system in accordance with one or more embodiments of the invention.

Now referring to FIG. 4, the inner workings of the magnetic gearbox 400, such as the magnetic gearbox 320 of FIG. 3, is described. FIG. 4 depicts the inner workings of a magnetic gearbox 400, such as the magnetic gearbox 320 of FIG. 3 in accordance with one or more embodiments. The magnetic gearbox 320 utilizes permanent magnets to transmit the power between an input shaft to an output shaft.

A first ring member 410 is an outer magnetic ring. A second ring member 420 is an inner magnetic ring that is located within the outer magnetic ring, and the inner magnetic ring has a smaller diameter than the outer magnetic ring. An interface 430 is disposed between the outer magnetic ring and the inner magnetic ring. In one or more embodiments, the interface 430 can include a ferromagnetic material.

In one or more embodiments, the interface 430 is used as flux paths for the inner and outer magnetic rings. This is configurable to create field harmonics produced by the magnetic rings. In addition, the number of poles or pole-pieces can be selected to couple the harmonic field to achieve the required or selected gear ratio to achieve a desired output torque. There is no mechanical contact between the moving parts in the magnetic gearbox.

The magnetic gearbox 400 is configured to incorporate overload protection which results in the contactless magnetic gear slipping during the overload event. The overload event can occur when an obstruction such as ice or debris is lodged on the windshield.

Also, magnetic gearboxes offer a high torque density (Nm/kg) when compared to conventional gearboxes. Therefore, the magnetic gearboxes reduce the overall weight for the same torque output of the conventional gearboxes. In addition, the magnetic gearbox does not suffer from the cyclic stress from the abrupt change in the motor direction as the gear teeth of the conventional contact gearboxes.

Figure 5:
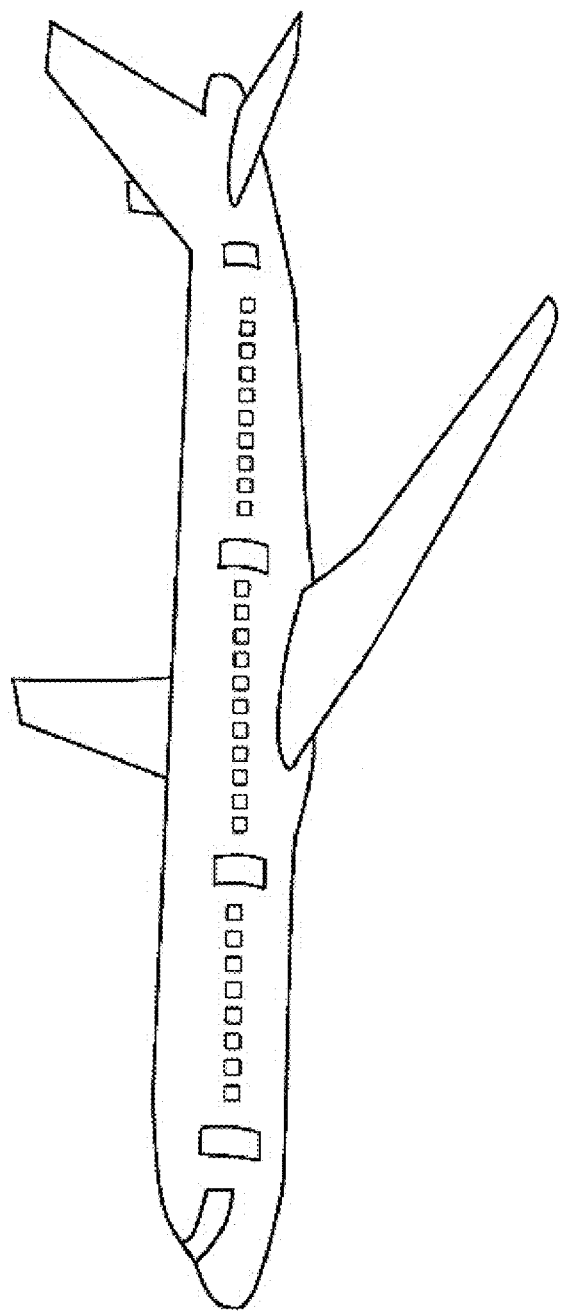
FIG. 5 depicts an aircraft (or other applications such as in helicopters or automobiles) that can implement the wiper system in accordance with one or more embodiments of the invention.

FIG. 5 depicts an aircraft 500 (or other applications such as in helicopters or automobiles) that can implement the system 300 and including the magnetic gearbox 400 shown in FIGS. 3 and 4, respectively.

Now referring to FIG. 6, a flowchart of a method 600 for operating the direct drive system for a wiper assembly is provided. The method 600 can be implemented in the system such as that shown in FIG. 3. The method 600 begins at block 602 and proceeds to block 604 and operates the motor to drive a wiper system. In one or more embodiments, a controller can provide a signal to the motor to operate the motor. The motor can be operated at varying speeds according to the signal. Block 606 receives an in input from the motor. In one or more embodiments, a first ring member of the gearbox is magnetically coupled to a second ring member of the gearbox, wherein the second ring member is positioned within the first ring member. Block 608 converts, at the gearbox, the input from the motor to an output used to drive the wiper system. Block 610 drives the wiper system based on the output. The method 600 ends block 612. It should be understood that different steps or additional steps can be incorporated into the method 600 for operating the windshield wiper system and is not limited by the steps shown in FIG. 6.

The technical effects and benefits include enhancing the life, reliability, and safety of the wiper system. There is no mechanical wear as experienced in the convention gearbox. Overload protection is implemented and there is no need for additional control to protect the system. The safety protection by the stopper, in case of failure of the bi-directional control of the motor.

The technical effects and benefits also include improved performance and accuracy of the wiper system. The technical effects and benefits of the system described herein offers a high torque density and low weight solution. In addition, the system is a low maintenance system that does not require routine maintenance performed on conventional gearboxes such as the use of transmission oil and grease. The technical effects and benefits of the system include providing the flexibility to arrange the system in both a co-axial and perpendicular shaft arrangements for multiple platform applications.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A direct drive wiper system, the system comprising: a motor operably coupled to a wiper system to drive one or more wiper arms of the wiper system; a gearbox, wherein an input of the gearbox is coupled to the motor and receives a rotational input from the motor and an output of the gearbox is coupled to the wiper system, wherein the gearbox is configured to convert the rotational input from the motor to a rotational output to drive the wiper system; stopper coupled to the gearbox and the wiper system, wherein the stopper is configured to stop the one or more wiper arms of the wiper system; a brake configured to place the one or more wiper arms in a parked position and is further configured to lock the one or more wiper arms in position after stopping the one or more wiper arms and placing them in the parked position to hold the one or more wiper arms in place relative to a windshield of an aircraft when not in use; wherein the gearbox is a magnetic gearbox; wherein the magnetic gearbox comprises an outer ring, an inner ring, and an interface, wherein the interface comprises pole-pieces that are disposed between the outer ring and the inner ring.

2. The system of claim 1, wherein the pole-pieces of the interface is are composed of a ferromagnetic material.

3. The system of claim 1, wherein the pole-pieces are coupled to a wiper shaft of the wiper system.

4. The system of claim 1, wherein the motor is coupled to the inner ring to provide an input to the magnetic gearbox.

5. The system of claim 1, wherein the outer ring is stationary.

6. The system of claim 1, further comprising an integrated brake and stopper, wherein the integrated brake and stopper is coupled to the output of the gearbox and a wiper shaft.

7. The system of claim 1, wherein the motor is a bi-directional motor, wherein the motor is configured to drive the one or more wiper arms in a forward and reverse direction.

8. The system of claim 1, wherein the gearbox is a multi-stage magnetic gearbox.

9. The system of claim 1, wherein the gearbox is in a coaxial gear arrangement.

* * * * *